United States Patent
Yamamoto (10) Patent No.: US 6,633,689 B2
(45) Date of Patent: *Oct. 14, 2003

(54) IMAGE REPRODUCING APPARATUS

(75) Inventor: Hiroyasu Yamamoto, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,089

(22) Filed: Jun. 11, 1999

(65) Prior Publication Data

US 2003/0123756 A1 Jul. 3, 2003

(30) Foreign Application Priority Data

Jun. 12, 1998 (JP) .......................... 10-164745

(51) Int. Cl.$^7$ ................................. G06K 9/03
(52) U.S. Cl. ................. 382/309; 345/629; 345/723; 358/450; 358/452; 382/274; 382/298
(58) Field of Search ................ 345/382, 349, 345/355, 629, 630, 723; 358/1.18, 1.6, 451, 506, 450, 452; 396/6, 287, 299; 382/298, 309, 274

(56) References Cited

U.S. PATENT DOCUMENTS

| | | | |
|---|---|---|---|
| 4,646,252 A | * 2/1987 | Terashita | 382/141 |
| 5,467,168 A | * 11/1995 | Kinjo et al. | 355/77 |
| 5,684,601 A | * 11/1997 | Endo | 358/487 |
| 5,768,444 A | * 6/1998 | Nishimura | 382/298 |
| 5,829,853 A | * 11/1998 | Hibino et al. | 353/25 |
| 5,913,019 A | * 6/1999 | Attenberg | 358/1.18 |
| 5,963,203 A | * 10/1999 | Goldberg et al. | 345/328 |
| 5,974,190 A | * 10/1999 | Maeda et al. | 382/255 |
| 5,986,773 A | * 11/1999 | Goto et al. | 358/487 |
| 6,128,446 A | * 10/2000 | Schrock et al. | 396/297 |
| 6,330,051 B1 | * 12/2001 | Takanashi | 355/40 |
| 6,351,321 B1 | * 2/2002 | McIntyre | 358/450 |

FOREIGN PATENT DOCUMENTS

| JP | 54-026729 A | 2/1979 |
|---|---|---|
| JP | 08-168031 A | 6/1996 |

* cited by examiner

Primary Examiner—Timothy Johnson
Assistant Examiner—Gregory Desire
(74) Attorney, Agent, or Firm—Birch, Stewart, Kolasch & Birch, LLP (57) ABSTRACT

An image reproducing apparatus that includes a display device for displaying a plurality of frames of read images, a specifying device for specifying a group of images having a same or similar scene among the plurality of displayed frames, a calculation device for calculating image reproducing conditions under which the specified group is processes, so that the specified group are reproduced as same or similar images; and a device for redisplaying the specified group with corrections on the display device. The apparatus is capable of printing uniformly finished photo prints for similar frames on an identical film simply, so as to reduce the burden on the operator.

20 Claims, 4 Drawing Sheets

IMAGE REPRODUCING APPARATUS

BACKGROUND OF THE INVENTION

The present invention relates to an image reproducing apparatus that photoelectrically reads images recorded on a film original, and outputs photo prints in which these images are reproduced as visible images.

a user often takes pictures (picture images) of same or identical, or similar or analogous scenes under same or identical, or similar or analogous photographing conditions, and he becomes unsatisfactory if these pictures, that is, images of the similar scenes are not reproduced as identically finished photo prints.

To accommodate such needs of the user, various techniques for reproducing similar images as identically finished photo prints have been proposed. For example, one technique involves the steps of reading a negative film by an image sensor or the like such as a CCD sensor with a low resolution to obtain pre-scanned images, calculating setup parameters from the pre-scanned images, displaying the processed images on a screen of image display means for verifying the images, and subjecting a group of same or similar images to a similar processing to thereby obtain identically finished photo prints.

Further, in an Advanced Photo System (hereinafter referred to as "APS") photographing information is recorded as magnetic information on a film by means of a camera when a user takes pictures with the camera. When the user specifies some frames as "series scene" when taking these picture images, designation of the series scene is recorded as the magnetic information to the specified frames on the film, and when the magnetic information is read (picked up) during an image reproducing process, the images of frames specified as the series scene are subjected to corrections so that images of photo prints will be finished identically as same or similar images.

However, according to an algorithm used for calculating the setup parameters, even if some images are specified as frames having similar scenes, they are sometimes finished, not as identical as expected. This is due to differences in the positions of the highlight portions and shadow portions of individual pictures, and due to differences in the position and size of main subjects to be photographed. There differences are attributable to image-to-image variations in average image density and variations in the overall color balance within each picture. That is, when the user takes a plurality of the pictures of similar scenes with his camera, the user obtains the images in which the density, color and the like of their main subject change little but in which the ratio of the occupying area of their backgrounds changes due to slightly changed compositions, etc., and these changed ratio of the background area cause the aforementioned variations in the average image density, overall color balance, etc.

To overcome this problem, the conventional techniques have required that the operator corrects the images of the similar scene manually on a frame by frame basis, in an effort to make all images of a similar scene uniform. Hence, the operator has to bear a heavy burden.

Similar problems arise in the case of the APS also. That is, the designation of the series scene is read from the magnetic information on the film, and processes the specified frames as the series scene identically based on the read magnetic information on the film. If the user specifies a group of pictures with the series scene in advance, and if he has pressed the shutter of his camera erroneously to include some foreign pictures in the group of the pictures with the series scene, then such improper frames to be processed as the series-scene pictures are processed as the series-scene pictures, and hence are inappropriately finished. This is unexpected, and is a problem.

SUMMARY OF THE INVENTION

The present invention is offered in view of the aforementioned conventional problems. An object of the invention is to provide an image reproducing apparatus capable of printing uniformly finished photo prints for similar frames on an identical film, in a simple manner, so as to reduce the burden on the part of the operator.

To achieve the above object, according to one aspect of the present invention, there is provided an image reproducing apparatus for photoelectrically reading images recorded on a photographic film and subjecting the read image data to image processing, to thereby reproduce the processed image data as visible images. The apparatus includes display means for displaying a plurality of frames of read images; means for specifying a plurality of frames of images as a group of images having a same or similar scene among the plurality of frames of the thus displayed on the display means; means for calculating image reproducing conditions under which the group of the specified images is processed, so that the group of the specified images are reproduces as same or similar images; and means for re-displaying the group of the specified images processed under the calculated image reproducing conditions on the display means.

It is also preferable that the image reproducing conditions include parameters for controlling at least one of density, tone balance and contrast.

It is further preferable that the image reproducing apparatus include means for performing a process, when an operator has manually corrected one of the plurality of the frames of the specified images in the group on the display means, for correcting the rest of the frames of the specified images in the group similarly, and for re-displaying the corrected images on the display means. Additionally, the apparatus may include means for switching whether the process is performed or not.

It is also preferable that the image reproducing apparatus include means for replacing the corrected images that are re-displayed on the display means, with the previous images. The previous images are the images displayed on the display means before the corrected images are re-displayed.

It is still further preferable that the image reproducing apparatus include means for replacing the processed images that are re-displayed on the display means with the previous images.

It is also still further preferable that the means for specifying the group of images simultaneously specifies two or more groups of images on the display means.

DETAILED DESCRIPTION OF THE INVENTION

An image reproducing apparatus of the present invention will now be described in detail on the basis of a preferred embodiment shown in the accompanying drawings.

Figure 1:
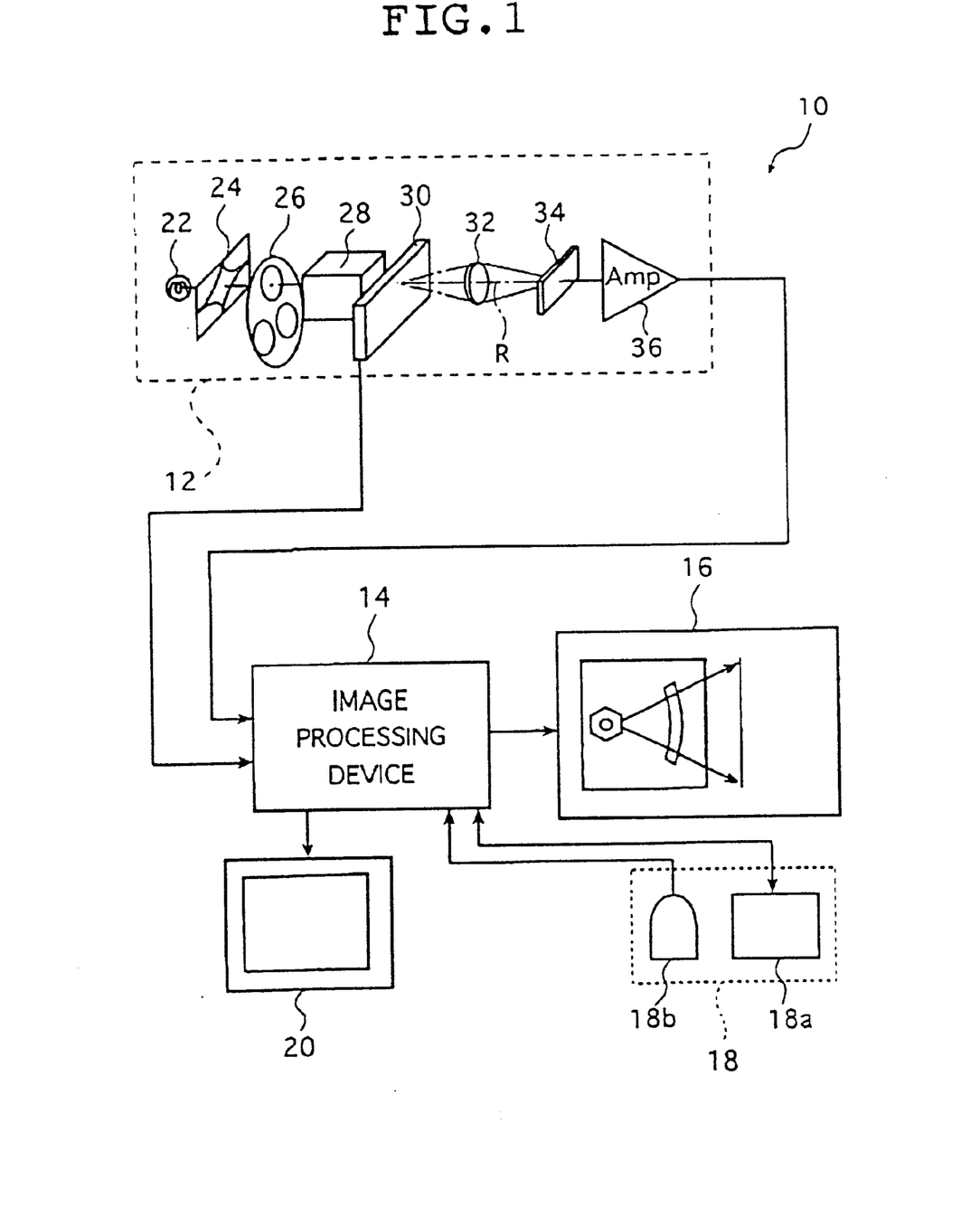
FIG. 1 is a block diagram showing an exemplary digital photo printer utilizing the present invention.

FIG. 1 is a schematic block diagram showing a digital photo printer, which is an embodiment of the image reproducing apparatus of the present invention.

The digital photo printer shown in FIG. 1 (hereinafter referred to as "photo printer") 10 basically includes a scanner (i.e., an image reading device) 12, an image processing device 14, and a printer (i.e., an image recording device) 16. The scanner 12 photoelectrically reads images photographed on a film F. The image processing device 14 performs the basic functions of image processing of the read image data (i.e., image information) and selection, setting and modification of image processing conditions for the image data, and also performs functions including the operation and overall control of the [whole] photo printer 10. The printer 16 causes a photosensitive material A to be exposed by an optical beam modulated in accordance with the image data processed by the image processing device 14, develops the exposed photosensitive material A, and outputs the developed photosensitive material A as (finished) photo prints P.

Further, an operation system 18 and a monitor (i.e., display means) 20 are connected to the image processing device 14. The operation system 18 includes a keyboard 18a and a mouse 18b for entering (or setting) various conditions, selecting and instructing processes, and entering instructions for color/density corrections or the like. The monitor 20 displays, e.g., images read by the scanner 12, various operating instructions, and setting/registering screens for setting and registering various conditions. While checking the images displayed on the monitor 20, an operator specifies or designates, via the operation system 18, a plurality of those images as a group of images photographed under same or similar photographing conditions, that is, photographing same or similar scene.

The scanner 12, which photoelectrically reads images photographed on the film F, etc., frame by frame, includes a light source 22, a variable stop 24, and three R-, G- and B-color filters for separating each image into the primary colors, which are R (red), G (green) and B (blue). The scanner 12 also includes: a rotary color filter plate 26 for causing an arbitrary color filter to act on the optical path; a diffusion box 28 for providing a uniform distribution of reading light incident on the film F in the direction of plane of the film F; a film carrier 30 for transporting the film F; an image-forming lens unit 32; a CCD sensor 34, i.e., an area sensor for reading one frame of image on the film F; and an amplifier 36.

In such a scanner 12, the reading light injected from the light source 22, having its amount adjusted by the variable stop 24, having its color adjusted via the color filter plate 26, and having itself diffused by the diffusion box 28 is incident on and passes through one frame of image on the film F located at the reading position corresponding to the optical axis R, whereby the projected light which carries the image of the frame photographed on the film F is obtained.

The film F is transported in the longitudinal direction by the film carrier 30 (hereinafter referred to simply as "carrier 30"), so that respective frames (the photographed images) to be printed are sequentially located at their reading position.

Note that and APS film (cartridge type) is used as the film F in the examples shown in the drawings. The photo printer 10 has, in addition to the carrier 30, carriers dedicated to films of various sizes including conventional 135-size negative films, film shapes such as slides, and processes such as trimming. Thus, a suitable carrier is selected in accordance with the process, shape or type of film, etc., and the selected carrier is attached to a predetermined position in the scanner 12.

The projecting light to the film F forms an image on the light-receiving surface of the CCD sensor 34 via the image-forming lens unit 32, and the formed image is photoelectrically read by the CCD sensor 34. Then, the output signal carrying the read image is amplified by the amplifier 36 and sent to the image processing device 14.

The CCD sensor 34 is, e.g., an area CCD sensor having 1380×920 pixels. In the exemplary apparatus shown in FIG. 1, the CCD sensor 34 is designed so that the pixels can be moved two-dimensionally in the direction of arranging the pixels by a distance corresponding to the half of a pixel (i.e., the sensor 34 can perform pixel shifting operation). As a result of this operation, the number of read pixels can be increased, in nominal terms, as many as 4 times. A line CCD sensor 34, such as a 3-line CCD sensor having R-, G- and B-line CCD sensors, may be used as the CCD sensor in place of the area CCD sensor.

The scanner 12 performs an image reading operation as described above three times, by sequentially inserting the color filters of the color filter plate 26, respectively, so that one frame of image can be read by separating the image into the three primary colors, R, G and B.

In the meantime, the photo printer 10 effects pre-scanning for reading the image with a low resolution in order to determine its image processing conditions and the like, prior to an image reading operation for outputting a photo print P (i.e., prior to fine scanning). Therefore, a total of six image reading operations is performed per frame.

Figure 2:
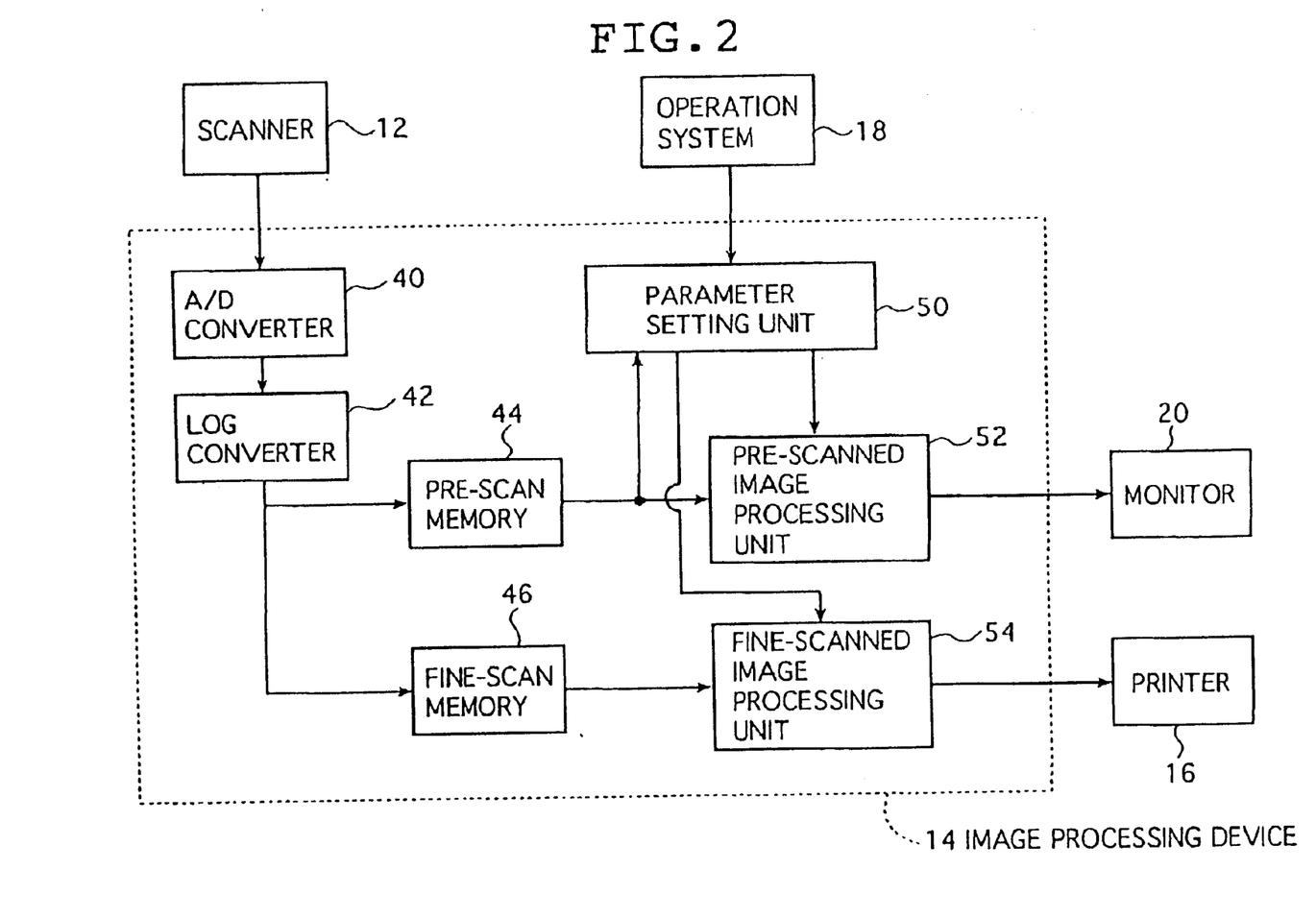
FIG. 2 is a block diagram showing an exemplary image processing device of the digital photo printer shown in FIG. 1.

FIG. 2 shows the image processing device 14 in a block form.

While FIG. 2 shows only components related mainly to the image processing (i.e., the processing of image data), the image processing device 14, e.g., supervises the entire photo printer 10 in addition to the image processing. Therefore, the image processing device 14 includes a memory for storing data necessary for operating the whole photo printer 10 and means for determining the aperture of the variable stop 24 for fine scanning, other than those components shown in FIG. 2. Further, the operation system 18, the monitor 20, and the printer 16 are connected to these components of the image processing device 14 through a CPU of the image processing device 14 (or a CPU bus).

The monitor 20 is used to display image data (pre-scanned data) obtained by pre-scanning. The operator specifies a plurality of frames as a single group while checking a displaying screen of this monitor through the operation system 18.

The image processing device 14 includes an A/D (analog-to-digital) converter 40, a LOG (logarithmic) converter 42, a pre-scan (frame) memory 44, a fine-scan (frame) memory 46, a parameter setting unit 50, a pre-scanned image processing unit 52 and a fine-scanned image processing unit 54. Note that the A/D converter 40 may be installed in the scanner 12 instead of the image processing device 14.

The R, G and B image data applied from the scanner 12 are converted into digital image data by the A/D converter 40, respectively, and the digital image data are then logarithmically converted by the LOG converter 42. The pre-scanned data and the fine-scanned data are stored in the pre-scan memory 44 and the fine-scan memory 46, respectively. Note that the pre-scanned and fine-scanned data are basically identical except that they are different in signal level and pixel density. The reason why their signal levels are different is that in the exemplary photo printer 10 shown in FIG. 1, the pre-scanned data is used to optimize the aperture of the variable stop 24, and fine scanning is effected based on the optimized aperture.

Further, the image data may be subjected to various corrections such as a DC offset correction, a dark-time correction and a shading correction whenever necessary between the LOG converter 42 and the memories 44 and 46.

The parameter setting unit 50 determines image processing conditions for pre-scanned and fine-scanned data. The parameter setting unit 50 also determines automatically the conditions for processing the plurality of images which are specified as a single group by the operator. Information (i.e., instructions) which the operator has entered through the operation system 18 and magnetic information read from the film F via the carrier 30 are sent to the parameter setting unit 50. Then, the parameter setting unit 50 acquires pieces of information about finishing processes and photographing conditions from the received information.

The pre-scanned image processing unit 52 reads pre-scanned data from the pre-scan memory 44, subjects the read data to predetermined image processing, and displays the processed data on the monitor 20. As described before, the operator selects a plurality of frames of images from the images displayed on the monitor 20 as having a same or similar scene, and specifies or designates the selected images as belonging to a single (same) group. The parameter setting unit 50 calculates identical or approximate image reproducing conditions under which the specified or designated images belonging to the specified same group are processed. The calculated conditions are sent to the pre-scanned image processing unit 52. The pre-scanned image processing unit 52 subjects the pre-scanned data to the image processing under these image reproducing conditions, and re-displays the processed images on the monitor 20, that is, switches a displayed image on the monitor 20 from the previous image to the processed image.

The operator checks these processed images displayed on the monitor 20, and when he has corrected one of these specified images belonging to the same group manually through the operation system 18, the parameter setting unit 50 automatically sets a parameter so that a similar correction will be made on the rest of the specified images of the same group. As a result, the pre-scanned image processing unit 52 corrects the rest of the specified images, and all the corrected images are then re-displayed on the monitor 20, that is, the displayed image on the monitor 20 is switched from the processed images to the corrected images. However, the second part of the correction, i.e., the step for correcting the rest of the images belonging to the same group and re-displaying all the corrected images of the same group, can be skipped by allowing the operator to enter an instruction through the operation system 18, even if the first part of the correction, i.e., the step of correcting one of the specified images in the same group has been performed.

Further, to accommodate needs of the operator such as canceling and changing the previous designation or specification of the same group, or canceling the correction made on the same group, the operator can give, through the operation system 18, an instruction to cancel the images re-displayed on the monitor 20 and to replace the re-displayed images with the previous images.

The fine-scanned image processing unit 54 reads fine-scanned data from the fine-scan memory 46, and subjects the read fine-scanned data to such processing including a color and tone correction process, an enlargement/reduction process in accordance with electronic variable magnification, a dynamic range compression/extension process and a sharpness process. The fine-scanned image processing unit 54 also subjects the same image processing to a plurality of images specified as a single (same) group under image reproducing conditions determined by the parameter setting unit 50. The image-processed data is applied to the printer 16 so as to be reproduced as finished photo prints.

The operation of this embodiment will hereinafter be described.

Figure 3:
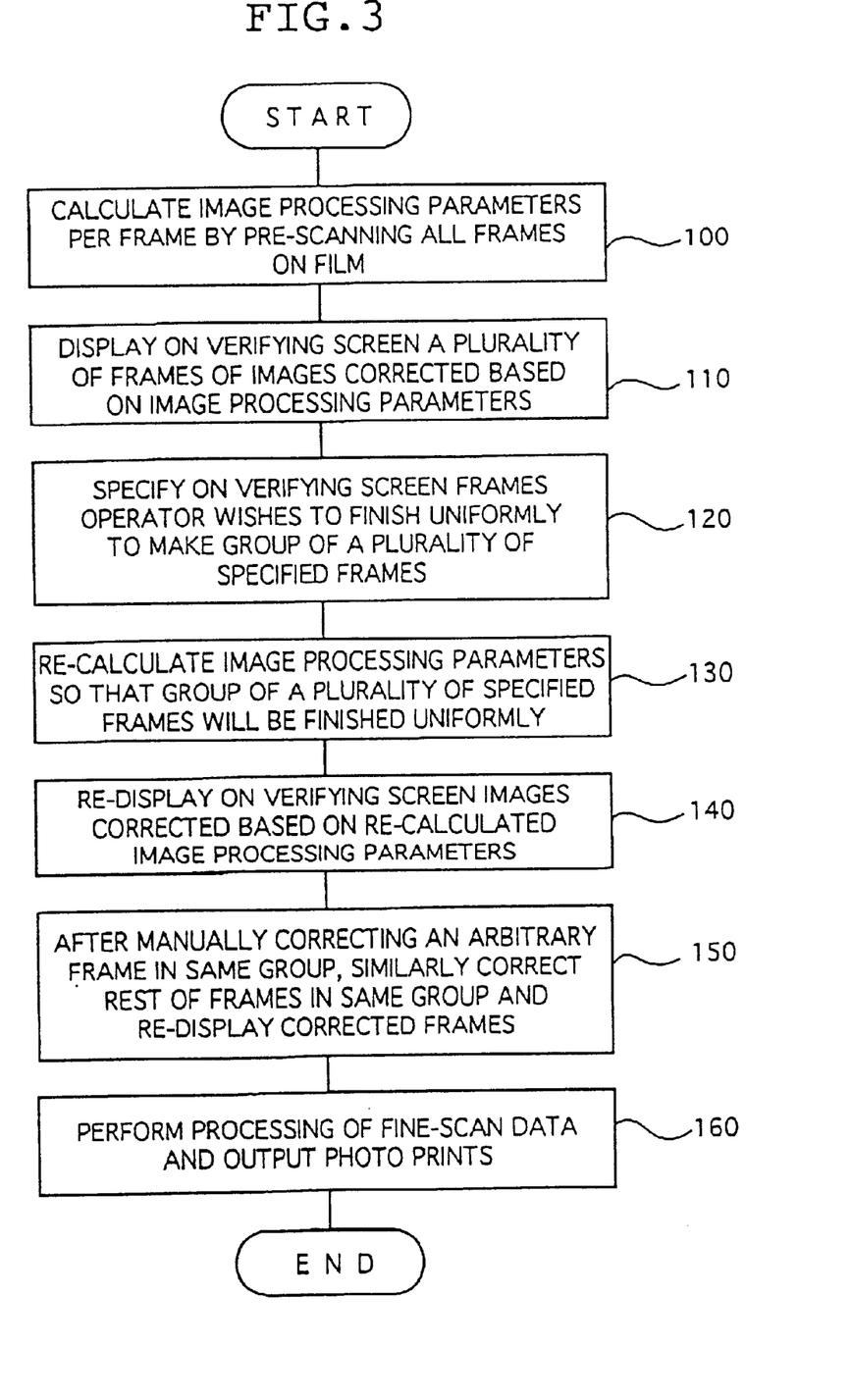
FIG. 3 is a flowchart showing a process performed in this embodiment.

FIG. 3 is a flowchart showing a flow of the processing performed in this embodiment. The operation will be described with reference to the flowchart.

In step 100 of FIG. 3, the scanner 12 pre-scans all of the frames of the film F. The obtained pre-scanned data is stored in the pre-scan memory 44. The parameter setting unit 50 reads the pre-scanned data from the pre-scan memory 44, prepares a density histogram, and calculates image characteristics amounts such as highlight (minimum density), shadow (maximum density), average density and LATD (large area transmission density) so as to calculate image processing parameters per each frame.

Further, concurrently, fine-scan reading conditions including such as the aperture (value) of the variable stop 24 are set based on the pre-scanned data, and the scanner 12 is so adjusted as to match the set conditions. Then, the scanner 12 fine-scans the film F, and the fine-scanned data is stored in the fine-scan memory 46.

Next, in step 110, the pre-scanned image processing unit 52 reads pre-scanned data from the pre-scan memory 44, corrects the pre-scanned data based on the calculated image processing parameters, and displays the corrected pre-scanned data on the monitor 20.

Figure 4:
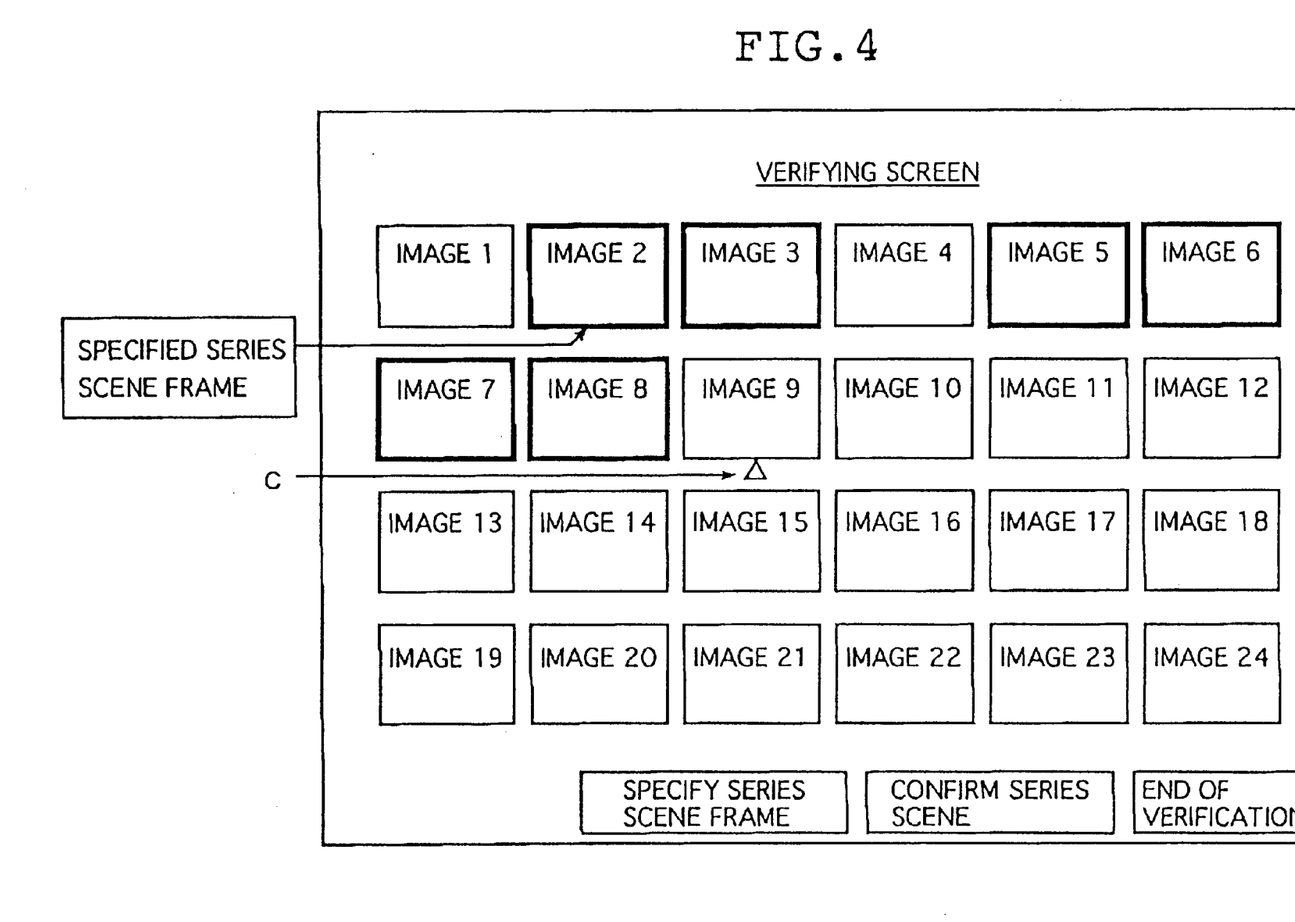
FIG. 4 is an explanatory diagram showing an example of images displayed on display means in this embodiment.

FIG. 4 shows an example of the images displayed on a screen (which is the verifying screen) of the monitor 20. In this example, 24 frames of images are displayed on one screen. Thus, if the film used is a film roll with 24 exposures, the verifying screen can display the whole film on one screen at a time. It is preferable to display the whole film on one screen at a time, but if it is not possible to do so, the verifying screen may be scrolled so that the operator can verify the whole film continuously.

Next, in step 120, the operator verifies the images displayed on the monitor 20 while watching them, and designates or specifies a plurality of frames of images he wishes to give a uniform finish (i.e., series scene) as a group.

As shown in FIG. 4, the images of the series scene are specified by moving a cursor C. In the example shown in FIG. 4, images 2, 3, 5, 6, 7 and 8 are specified as the series scenes. A group of the images of the series scene does not necessarily consist of a plurality of successive frames. It may consist of images picked up at such irregular intervals as in the example shown in FIG. 4, or even totally at random. Since the operator specifies a group of the images of the series scene interactively through the screen in this way, a frame considered inappropriate to be processed as a series-scene image can be eliminated even if such frame has been included in the group of series scenes specified on an APS film.

Further, the operator can specify two or more groups of images of the series scenes.

In step 130, when the operator establishes his designation or specification of the series-scene group of image data to be processed for one film, the parameter setting unit 50 automatically re-calculates the image processing parameters so that a plurality of frames specified as the series scene can be finished uniformly. The specification of the image group is not limited to one group but a plurality of series-scene groups may be specified in some cases, and in these cases, the image processing parameters are re-calculated for each group. The image processing parameters include those for controlling at least any one of density, tone balance and contrast. The image processing parameter may be set to a value matching one of the images in the group, or to an average among the images in the same group.

Next, in step 140, the pre-scanned image processing unit 52 corrects the pre-scanned data based on the re-calculated image processing parameters, and displays again the corrected data on the monitor 20. The operator verifies again the images while watching the screen, and corrects the re-displayed images manually through the operation system 18 whenever necessary.

When the operator manually corrects an arbitrary frame in the group, the parameter setting unit 50 sets the image processing parameters so that the rest of the frames in the same group are similarly corrected. Then, in step 150, the pre-scanned image processing unit 52 corrects the image data based on the set image processing parameters, and displays again the corrected data on the monitor 20.

The operator sometimes wishes to make a manual correction only for one of the frames belonging to the group of interest, and does not wish to correct the rest of the frames in the group. In such a case, the operator can give, through the operation system 18, such an instruction as not to similarly correct the rest of the frames in the group.

Further, in step 140, the image processing is performed based on the image parameters so calculated as to finish the images in the series-scene group uniformly or similarly, and the processed image data is re-displayed on the monitor 20. However, the operator sometimes wishes to check the previous images which had been displayed before they were corrected and re-displayed because he wishes to modify the already made specification of the group, for example. In such a case, the operator can give an instruction to replace the re-displayed images with the previous images through the operation system 18. Thus, the operator can modify the already made specification of the group. This function helps the operator specify groups of series-scene images with a simple procedure.

Further, in this embodiment, once the operator specifies a group of similar images on a film which are to be finished uniformly, the similar images in that specified group can be automatically finished uniformly, and the operator can verify the finish of these images on the verifying screen of the monitor 20 automatically. In addition, when the operator wishes to modify one of the images in the group on the verifying screen, the rest of the images in the group can be automatically modified similarly, and hence the operator can do verifies efficiently.

For example, the image reproducing system of this embodiment is advantageous in preparing trade samples and portrait shots which are required to be finished identically.

Once the operator has completed the specification of the group and the setting of the image processing parameters, processing of fine-scanned data is performed in step 160 to thereby output photo prints.

The fine-scanned image processing unit 54 reads fine-scanned data from the fine-scan memory 46, subjects the read data to the image processing based on the set image parameters, and applies the processed image data to the printer 16.

While transporting the photosensitive material in the auxiliary scanning direction, the printer 16 scans and exposes the photosensitive material by causing an optical beam, which is deflected in the main scanning direction while modulated in accordance with the image data sent from the image processing device 14, and hence the printer 16 forms latent images. The exposed photosensitive material is developed while sequentially subjected to the processes of color development, bleaching and fixing, and rinsing to render the latent images visible, and then the visible images are dried, and finally outputted as photo prints.

While the embodiment described above is designed to process an image as a digital signal and thus to give a digital exposure, the present invention is not limited to the digital exposure. The invention can be applied to an analog (direct) exposure as well. In the case of analog exposure, an image is printed onto a photosensitive material (a photographic printing paper) by a so-called direct exposure in which an image on a film is projected onto the photographic printing paper to surface-expose the photographic printing paper. Therefore, both digital and analog exposure are processed basically the same way up to step 150 of FIG. 3 in which the operator displays the images on a film on the monitor and specifies some of these images as a group. However, the image processing parameters for the analog exposure as exposure correction parameters. The exposure correction parameters include, e.g., values to be set for adjusting the light amount of a lamp, the light adjustment filter, and the aperture. For images belonging to the same group, the same exposure correction parameter is set, and hence the images in the same group are printed on a photographic printing paper with the same exposure amount (under the same exposure conditions) so as to obtain the same finish.

While the image reproducing apparatus of the present invention has been described in detail in the foregoing, the present invention is not limited to the aforementioned embodiment. It goes without saying the various improvements and modifications can be made within such a scope as not to depart from the spirit of the present invention.

As described above, according to the present invention, once the operator specifies a group of frames having a same or identical, or similar or analogous scene from frames on one film displayed on the display means, photo prints having a uniform finish can be produced for such the same group of specified frames automatically, and how the photo prints would look like can be displayed again on the display means. Therefore, the work load on the part of the operator can be reduced. Further, the operator specifies the same group of frames for automatic processing interactively. Thus, for example, if the operator has specified a group of series scenes by erroneously including an inappropriate frame in the APS, he can set aside such a frame so as not to be processed as a series-scene image, and hence he can prevent its photo print from being finished inappropriately.

Further, when the operator has corrected some of the images in the same group while checking their re-displayed finish on the screen of the display means, and if the operator selects the automatic correction processing for the rest of the frames in the same group, then the operator can efficiently perform verification.

The present invention is particularly advantageous in preparing trade samples, portrait shots, etc., which are required to be finished identically.

What is claimed is:

1. An image reproducing apparatus for photoelectrically reading images recorded on a photographic film and subjecting the read image data to image processing to thereby reproduce the processed image data as visible images, comprising:
- display means for displaying a plurality of frames of the read images;
- means for specifying a group of images having a same or similar scene among said displayed plurality of frames;
- means for calculating image reproducing conditions under which said specified group is processed, so that said specified group are reproduced as same or similar images;
- means for re-displaying said specified group that are processed under the calculated image reproducing conditions on said display means;
- means for performing a process that corrects the rest of the frames of the specified images in said group similarly, and which re-displays the corrected images, when an operator manually corrects one frame of said specified group on said display means; and
- means for switching whether said process is performed or not.

2. An image reproducing apparatus according to claim 1, wherein the image reproducing conditions include parameters for controlling at least one of density, tone balance and contrast.

3. An image reproducing apparatus according to claim 1, further comprising:
- means for replacing the corrected images re-displayed on said display means with the previous images which are the images displayed on said display means before the corrected images are re-displayed.

4. An image reproducing apparatus according to claim 1, further comprising:
- means for replacing the processed images that are re-displayed on said display means with the previous specified group of images which are displayed prior to the processed images being re-displayed.

5. An image reproducing apparatus according to claim 1, wherein said means for specifying the group of images simultaneously specifies two or more groups of images on said display means.

6. An image reproducing apparatus, comprising:
- a display for displaying a plurality of frames of photo-electrically read images; and
- a processor for specifying a group of images having a same or similar scene among said displayed plurality of frames, for calculating image reproducing conditions under which said specified group is processed, so that said specified group are reproduced as same or similar images, and for re-displaying said specified group that have been processed under said calculated image reproducing conditions on said display,
- wherein, when an operator manually corrects one frame of said specified group on said display, said processor performs a process that automatically corrects the rest of the frames of the specified images in said group similarly, and re-displays the corrected images.

7. An image reproducing apparatus according to claim 6, wherein said specified group of frames our displayed in side-by-side fashion in rows and columns on said display.

8. An image reproducing apparatus according to claim 6, wherein the image reproducing conditions include parameters for controlling at least one of density, tone balance and contrast.

9. An image reproducing apparatus according to claim 6, wherein said processor is configured to switch whether said process is to be performed or not.

10. An image reproducing apparatus according to claim 6, wherein said processor is further configured to replace, on said display, the corrected and re-displayed images with the previous specified group of images that are displayed prior to re-display of the corrected images.

11. An image reproducing apparatus according to claim 6, wherein said processor is further configured to simultaneously specify two or more groups of images on said display.

12. A method of reproducing images from a photographic film having a plurality of frames of image data, comprising:
- pre-scanning the film on a frame by frame basis to calculate image processing parameters for each frame;
- displaying frames that were corrected based on the calculated image processing parameters in side-by-side fashion in rows and columns on a verifying screen;
- specifying frames desired to be uniformly finished as a group, from those corrected frames displayed on the screen;
- re-calculating the image processing parameters for the specified group; and
- re-displaying the corrected images of the specified group on the verifying screen, said corrected images based on the re-calculated image processing parameters,
- wherein, if one frame from the group is manually corrected, the rest of the frames of the same group are automatically corrected in the same manner, and re-displayed on the verified screen.

13. The image processing method according to claim 12, wherein the pre-scanned frames are different in signal levels and pixel density than a fine-scanned data.

14. The image reproducing method according to claim 13, where the pre-scanned frames is used to optimize an aperture of a variable stop and the fine-scanned data is effected based on the optimized aperture.

15. An image reproducing apparatus, comprising:
- a display for displaying a plurality of pre-scanned frames of photoelectrically read images; and
- a processor for specifying a group of images having a same or similar scene among said displayed plurality of pre-scanned frames, for calculating image reproducing conditions under which said specified group is processed, so that said specified group are reproduced as same or similar images, and for re-displaying said specified group that have been processed under said calculated image reproducing conditions on said display,
- wherein, when an operator manually corrects one frame of said specified group on said display, said processor performs a process that automatically corrects the rest of the frames of the specified images in said group similarly, and re-displays the corrected pre-scanned images.

16. An image reproducing apparatus for subjecting input image data to image processing to thereby reproduce the processed image data as visible images, comprising:
- display means for displaying a plurality of frames of input images;
- means for specifying a group of images having a same or similar scene among said plurality of frames displayed on said display means;
- means for calculating image reproduction conditions under which said specified group is processed, so that said specified group are reproduced as same or similar images;

means for re-displaying said specified group that are processed under the calculated image reproducing conditions on said display means;

means for performing a process that corrects the rest of the frames of the specified images in said group similarly, and re-displays the corrected images, when an operator manually corrects said calculated image reproducing conditions of one frame of said specified group on said display means to correct said one frame; and means for switching whether said process is performed or not, wherein said image subjects to the image processing under said calculated image reproducing conditions or under said corrected image reproducing conditions in case of correcting said calculated image reproducing conditions to thereby reproduce the processed image data as an image.

17. The image reproducing apparatus according to claim 16, wherein the image reproducing conditions include a parameter or parameters for controlling at least one of density, tone balance and contrast.

18. The image reproducing apparatus according to claim 16, further comprising:

means for replacing, on said display means, the corrected and re-displayed images with the pervious specified group of images that were displayed prior to re-displaying of the corrected images.

19. The image reproducing apparatus according to claim 16, further comprising:

means for replacing the processed images that are re-displayed on said display means with the previous specified group of images which are displayed prior to the processed images being re-displayed.

20. The image reproducing apparatus according to claim 16, wherein said means for specifying the group of images can specify two or more groups of images on said display means at a time.

* * * * *

UNITED STATES PATENT AND TRADEMARK OFFICE
CERTIFICATE OF CORRECTION

PATENT NO. : 6,633,689 B2  Page 1 of 1
DATED : October 14, 2003
INVENTOR(S) : Hiroyasu Yamamoto It is certified that error appears in the above-identified patent and that said Letters Patent is hereby corrected as shown below:

Column 9,
Line 2, change "our" to -- are --.

Column 10,
Line 1, change "processing" to -- reproducing --.

Column 11,
Line 13, change "said image" to -- said image data --.

Column 12,
Line 6, change "pervious" to -- previous --.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,633,689 B2
DATED : October 14, 2003
INVENTOR(S) : Hiroyasu Yamamoto

It is certified that error appears in the above-identified patent and that said Letters Patent is hereby corrected as shown below:

Column 9,
Line 59, change "our" to -- are --

Column 10,
Line 29, change "processing" to -- reproducing --

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,633,689 B2 Page 1 of 1
APPLICATION NO. : 09/330089
DATED : October 14, 2003
INVENTOR(S) : Hiroyasu Yamamoto It is certified that error appears in the above-identified patent and that said Letters Patent is hereby corrected as shown below:

<u>Column 9,</u>
Line 59, change "our" to -- are --.

<u>Column 10,</u>
Line 29, change "processing" to -- reproducing --.

<u>Column 11,</u>
Line 13, change "said image" to -- said image data --.

<u>Column 12,</u>
Line 6, change "pervious" to -- previous --.

This certificate supersedes the Certificates of Correction issued June 22, 2004 and July 19, 2005.

Signed and Sealed this

Thirty-first Day of March, 2009

JOHN DOLL
*Acting Director of the United States Patent and Trademark Office*